Nov. 14, 1933.   C. R. EDWARDS ET AL   1,934,701
METHOD AND APPARATUS FOR CEMENTING
Filed Jan. 31, 1931
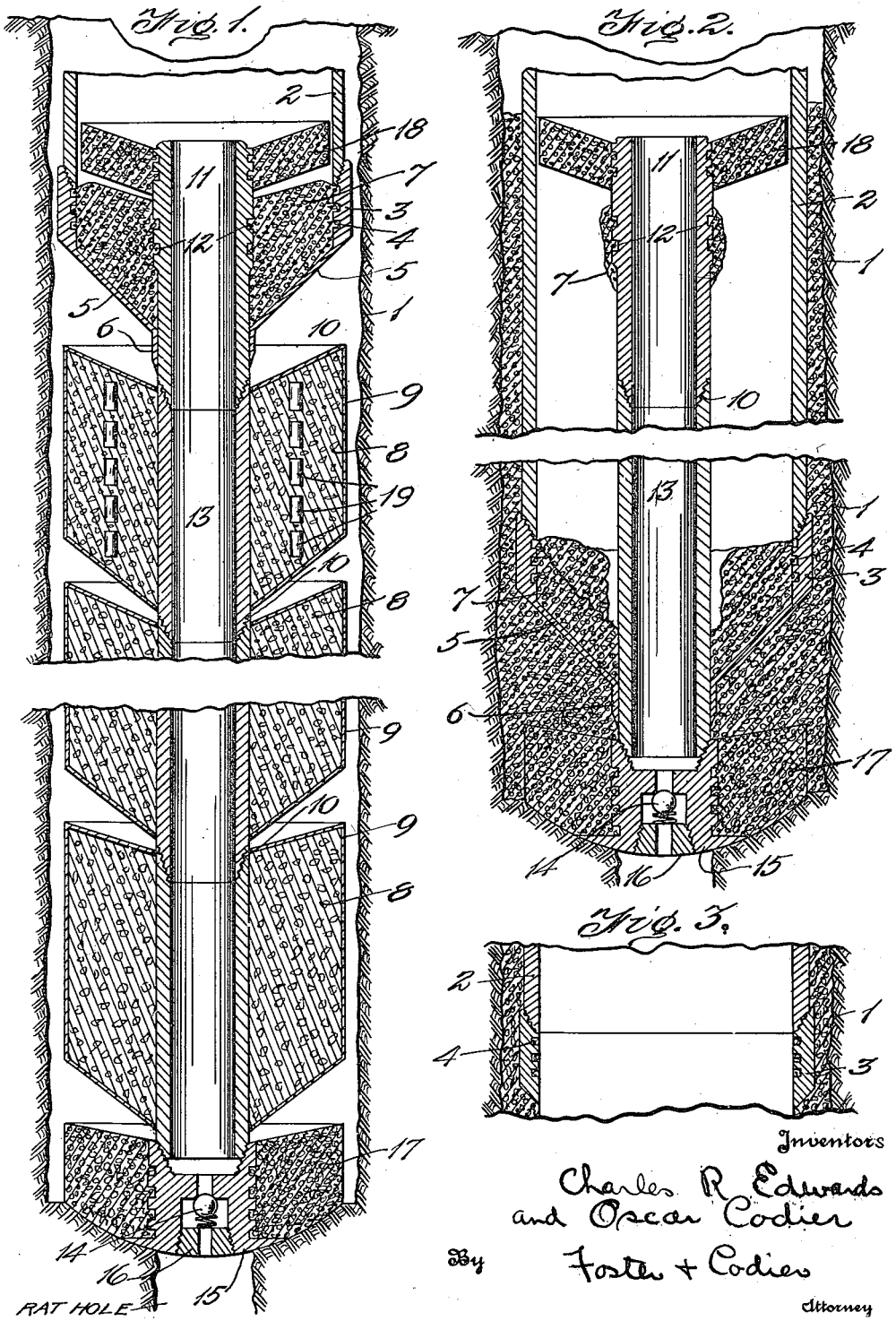
Inventors
Charles R. Edwards
and Oscar Codier
By Foster + Codier
Attorney Patented Nov. 14, 1933

1,934,701

UNITED STATES PATENT OFFICE 1,934,701

METHOD AND APPARATUS FOR CEMENTING

Charles R. Edwards and Oscar Codier, Houston, Tex.

Application January 31, 1931. Serial No. 512,728

9 Claims. (Cl. 166—21)

An object of the invention is to produce a very cheap, effective, safe and sure sealing means for use in well bores and other openings.

It has been asserted by numbers of experienced persons that more than 75% of the well casing cement jobs, made in certain fields for sealing the annular space between the casing and the walls of deep well bores are failures, even when the cement is applied by experienced men and the best of present equipment.

To overcome these failures more and more cement is being used, until now it is not unusual in some localities to use 1500 to 3000 sacks of cement in attempts to make a casing cement job that will hold.

It is thought by many that a perfect seal could be made in a great majority of cases with only a few sacks of cement, if the cement could be properly located while it is in the right condition.

An object of the present invention is not to wet the cement until it is at the sealing location, thus avoiding injury of the cementing material as is generally now the case.

Another object is to avoid adding any more water than the best amount for properly setting the cement: at present in order to easily pump the cement, large quantities of water are added, greatly increasing the failures.

Another object is to avoid contaminating the cement by passing the cement, through oily, muddy pipes and casing where much damage is done. Another object is to very thoroughly remove the thick coat of very heavy mud from the walls of the bore before cementing.

Another object is to avoid letting salt water, sulphur water and other fluids that injure the cement come in contact with the cement or mix with the cement.

Another object is to tightly close and seal the "rat hole" that is bored into the pay sand before cementing, so as to prevent oil and gas from rising up into the cement and doing damage to the cement.

Another object is to avoid exposing the cement, while lowering the cement, to any oil or gas that may be rising in the well bore.

Another object sought is to avoid contaminating the cement while it is setting by preventing saline, sulphurous and other damaging materials from the walls of the well bore coming in contact with the cement during the setting period.

Another object is to avoid letting any of the cement "furrow up" along the outside of the casing and leaving alternating mud and cement furrows up and down between the casing and the well bore.

Another object is to apply the least amount of water required so as to have a very stiff, heavy, pasty cement.

Another object is to apply a very enormous pressure to the very stiff, pasty cement so as to force this cement into the most intimate contact with the walls of the well bore and into cracks and crevices in the walls of the well so as to form a perfect seal.

Another object is to provide auxiliary sealing means that prevent contaminating the cement with other materials in the well bore.

Another object, that if fluid quick setting agents are used, is to apply them to the cement just before placing the cement in the sealing location.

Another object is to use liquid of known quality for wetting the cement and not to use liquids that often are injurious.

Another object is to avoid the cost of hauling and extra labor for handling many hundreds of sacks of extra cement used in present cement jobs.

Another object is to provide very simple equipment, and but little of it, and most of that recoverable for use in cementing casing.

Another object is to use the regular drilling crew and ordinary drilling equipment to do the cementing.

Another object is to save substantially all of the time now used by present well cementing methods.

Another object is to avoid the use of the very heavy, very special equipment that is now necessary for mixing and pumping the cement into place, and that often must be hauled many miles over terrain void of even fair roads.

Another object is to avoid cost of power, power connections, piping, labor, etc., used with the above very special equipment.

Figure 1 is a broken vertical, sectional view, showing one example of the apparatus as it is while being lowered.

Figure 2 is a similar view, showing the positions of the parts after the seal is completed.

Figure 3 is a vertical, sectional view of the cemented lower end of the casing after the plug is removed.

Referring now more particularly to the figures of the present example, let the walls of an opening or well bore be indicated by the numeral 1, and the object or casing that is to be sealed in the opening be indicated by the numeral 2.

The lower end of the casing 2 may usually be provided with some form of a shoe, guide plug, swedge or other device in the present case, and the numeral 3 indicates an example of a shoe attached if desired, in any suitable manner to the casing 2, as for instance by screw threads.

If desired, some provision may be made on the inside of the shoe 3 for securing a control, an example of such a provision is by grooves 4, 4.

A presently preferred form of the shoe includes an inwardly swedged portion 5. If desired, this portion may be formed somewhat thinner than other portions. Also, if desired, the shoe at its lower end, may be provided with some suitable parting means, for example tubular section 6 which is here shown with a thin or sharpened lower edge is now preferred.

It may in most instances be found expedient to use some kind of a control between the casing 2 and other parts of the apparatus. For instance, if desired, the control in many instances may be made of some molded or formed material. The present form of the invention shows at 7 an example of the control being molded cement held in place with reference to the casing 2 by being molded into the grooves 4.

In sealing an object into an opening it may be desired to provide a filler of some kind for chinking, closing, filling or sealing any space that might exist between the object and the side or sides of the opening. In the present invention it is desired to use a suitable filler for chinking, filling, closing or sealing any such space. An example of a filler is indicated at 8, where it is shown in the present example of the invention in a container 9.

If desired, the container 9 may be made up, for convenience, into sections, as is indicated in the present example by the numerals 9—9, and each section of the container 9 may contain some kind of filler or fillers.

The sections of the containers may, when so desired, be secured one to another in any suitable way, an example of such a securing is indicated at 10, showing conventional screw threaded connections.

If desired, the filler may be attached to the casing for convenience in lowering and properly locating the same preparatory to placing the filler in sealing position. If desired such attachment may be made through a control, for instance the container 9 may be secured, as by thread 10 to a head 11 and, if desired, the head 11 may in turn be attached to a coacting member of the control 7.

When the use of a control is desired, it may in many instances be found desirable to provide for some means permitting at times relative movement between the object or casing and the filler. An example for such a provision is disclosed in the drawing where the outer surface of the cylindrical head 11 is provided with grooves 12 and the control 7 has been molded in one or more of the grooves 12, so as to form a "break joint". It is very obvious that many other ways exist that could be used to attach the filler to the casing and the right is retained to use any other suitable attachment or mode of attaching the filler to the object or casing.

When it is desired to wash the slime and mud from the walls of the opening or bore immediately before locating and placing the filler, as may be desired in rotary drilled wells, it may be consistent to provide a passageway or water course from the casing down to some point lower, even to below the filler. An example of such a water course is shown at 13.

In lowering long strings of casing, which are enormously heavy, sometimes weighing a quarter of a million pounds, if it is desirous to float part of this casing weight, a float or back pressure valve may be installed either in the casing 2 or at some other point, for instance as is indicated in the drawing by the numeral 14 where an ordinary and well known form of such a valve including its seat, its closing means, a spring, its cage or housing 15, and a perforated spring seat 16 is indicated in detail. This valve is not only useful as a float valve but keeps fluid and other material from entering the lower end of passageway 13 or the lower end of casing 2 and if desired, also provides an opening to permit the use of a wash fluid, water for instance, to be forced down through the casing so as to wash the walls of the bore as may be desired, free of slime and mud before placing the filler.

If a smaller bore be present in the opening to be sealed it may be desired to plug this smaller opening or "rat hole" as it is sometimes called. A suitable plug of any desired form and material may be provided and it may, for instance, be located below the filler or at some other point higher up. In the present example such a plug is indicated at 17 where it is shown molded around the valve housing 15. If desired cement, concrete, a metal, wood or other material may be used; hardened concrete is shown in the example illustrated. The outside of the plug 17 may be of any suitable form, the form shown providing guiding means while lowering, and also being useful as a plug for the "rat hole", so as to prevent fluid or other material from coming out of or going into the "rat hole".

Some suitable guide or spider may at times be useful at the upper end of the head 11. The drawing at 18 indicates such a spider molded in this instance around the head 11. The purpose of such a spider is to hold the head 11 centrally in the casing 2 while the casing is being lowered with reference to the head 11 and also afterwards. This spider may be of molded cement, molded about the head 11 and free with respect to the casing 2 and the control body 7 also may be made of cement. The spider 18 may be made of any other suitable material which may be cut out by a hollow mill.

In almost all well cementing jobs it is the usual practice to "drill out the plug" after the cement has hardened, which operation usually requires from 4 to 10 days where accelerators or "quick set" ingredients are used, and a much longer period is required if accelerators are not used.

In the present invention when the guide plug is used below the filler there will also be a plug to be removed.

The container 9 may in some instances be made of sheet iron or sheet steel and if desired the outer cylindrical walls may be provided with vertical or longitudinal corrugations, or be partly ruptured by deformation along vertical or longitudinal lines at intervals, so as to provide for easy expansion while placing the filler or fillers.

If desired, the upper and lower heads of the container 9 may be blanked out of sheets larger in diameter than the diameter of the finished container and the diameter reduced by corrugating the blanks radially, so as to form heads of the right sizes and shapes. The corrugations on the heads and outer walls of the container will assist in preventing contamination of a cement filler during the hardening period by expanding out against the formation without rupturing.

It is also evident that at times it may be desirable to make the container 9 of other kinds of material such as canvas or other materials. It will be self-evident that in some instances the form of the container 9 can be greatly changed in form to suit conditions at hand.

If a filler 8 be of a material, say some kind of cement, that hardens in the presence of some other material, for instance water, it may be found better not to introduce the one material to the other material until immediately before placing the filler in its sealing position.

It is a well known fact that a delay of a few minutes in placing many cements after the cement is once wet is injurious and lowers the quality of the final product, and this is far more true where accelerators or "quick set" materials are used.

Since it has always required a very considerable time in deep well cementing to prepare hundreds and thousands of sacks of cement by mixing and to get this great quantity of mixed and wetted cement to the well and then down the well casing, and to set the plugs and finally to place the casing, it will be readily apparent that a very major reason for failures is great lapse of time between the wetting and placing of the cement in sealing position. The loss of time after the wetting of the cement has therefore been a serious problem in deep well cementing. This and a number of other problems are solved by the present invention, for where the filler 8 is Portland cement the container 9 can be made waterproof and filled with dry unset cement with or without aggregate, except for room for the cans or receptacles 19, 19, 19 which may be made of sheet metal or of clay, glass or other material.

The receptacles 19 are fragile enough that they are broken open as soon as the filler begins to move from its location in the well to its sealing position about the casing. The receptacles 19 are preferably in the form of elongated tubes sealed at both ends and containing water with or without cement accelerators. The receptacles 19 when used are filled with the proper setting agent for the particular cement used. This agent usually will be water or water and some "quick set" material. The receptacles 19 should be small enough and so distributed and of the proper number that the cement will be very quickly and evenly wetted with the least water required to carry out the work in hand, taking into account that fluid in the well may, under certain conditions which may greatly vary in different wells and in different fields, affect the amount of fluid that should be in the receptacles 19. Some hydraulic cements require less water than others for the best results.

The container or containers 9 surround a tube-like central portion 13 in fluid tight relationship as mentioned above, and the filler 8 for said container or containers 9 may be a hydraulic cement such as Portland cement, plaster of Paris, cement fondu, with or without admixture of any suitable aggregate such as sand, or sand and gravel, etc., or the said filler 8 may be a hydraulic cement topped with a layer of asphaltum, pitch or other bituminous or resinous material of a high melting point which flows in the solid state under the influence of great pressure. The layer of such bituminous material may be for example of a thickness of about $\frac{1}{12}$ to $\frac{1}{8}$ of the height of the individual containers, and even more. Layers of fabric, as canvas, may be used instead of the bituminous material, or such layers of canvas may be used and impregnated and surrounded by bituminous or resinous material and even rubber. Rubber may be used instead of resinous or bituminous material without canvas.

An example of the operation of the invention will now be given for its use in cementing casing in a well drilled in accordance with the rotary system of drilling. Let it be assumed that the filler 8 is Portland cement, and the manufacturer of the cement has pointed out the best amount of water and "quick set" to use under the conditions prevailing in the field in which the well is located, taking into account that the plug is to be drilled or milled out after a certain time. Also let it be assumed that the container 9 is properly filled with the cement and other materials. We are now ready to proceed with the operation. The guide plug with its float valve is then attached to the lower end of container 9 and the shoe 3, together with the control 7 and head 11 are attached to the upper end of the container 9. The filler in the container 9 and attached parts are lowered a convenient distance into the well bore and a section of the casing 2 is attached to the shoe 3 and other sections of the casing 2 are attached to the section connected to the shoe. The filler and associated parts and the casing are lowered into the well through the fluid in the well as more sections of casing are attached, until the guide plug 17 is slightly above the sealing place.

A pump for liquid is now attached by any suitable and well known connections to the upper end of the casing 2 and the pump started and fluid, either drilling fluid, water or drilling fluid thinned with water, is forced into the casing 2 and down through the passageway 13 and past the float valve 14 and up around the container 9 and the casing 2 to the top of the well. This "circulation", as it is called, washes the thick slime and heavy mud from the wall of the well as the casing and attached parts are moved. This washing is most pronounced at the point where the downward rushing fluid reverses to rise again because of the very swift eddy currents set up at this point. The filler, casing and attached parts are slowly lowered as the washing continues until the guide plug seats itself on the "rat hole" or on the bottom of the well if there is no "rat hole", whichever the case may be, and this arrests or stops the circulation, and the pump is stopped.

After the guide plug is stopped in its descent, the control 7 is released, in this case by breaking the hardened concrete by letting the weight of the casing down until the concrete breaks, and the casing 2 and shoe 3 are lowered. As the shoe 3 is lowered the sharp edge on the part 6 at the bottom of the shoe cuts through the upper end of the container 9 and the swedged part 5 of the shoe 3 forces and wedges the container body and the cement filler 8 outwardly rupturing or breaking the receptacles 19, thus wetting the cement filler 8 just before or as the cement filler is being placed in sealing position.

The casing 2 and shoe 3 are lowered until it will go no farther with safety. These operations will place the casing and other parts in about the positions shown in Figure 2. This lowering of the very heavy casing has transferred the weight of the casing onto the shoe and the shoe in turn has thus applied enormous pressure to the cement filler 8. This pressure is now far in excess of the usual hydrostatic pressure of the fluid about the casing 2 and on the cement filler 8 because the outer body of the container 9 prevents ready access of the fluid outside the casing to the cement filler 8 to soften it. The fluid originally present in the receptacles 19 is preferably only sufficient in quantity to dampen or wet the cement slightly, so that the cement filler is a very stiff, pasty mass that is now supporting not only the hydrostatic pressure of the fluid above but also the very great weight of the long, heavy string of casing. The filler 8 and its container 9 are thus forced into a most intimate contact with the wall of the well, making a substantially perfect seal between the casing and the wall of the well.

After the cement filler has sufficiently hardened a hollow milling tool, something on the order of an ordinary rotary casing shoe, of such diameter as to just pass down inside the casing 2, is run on some suitable pipe and the drill stem, and the spider 18, the control 7, the casing shoe 3, the cement filler below the casing shoe 3 and the guide plug 17 are cored through, the said milling tool passing downwardly over the head 11, the tube about the passageway 13, the part 6 of the shoe 3 and the valve parts. This leaves the head 11, the tube about the passageway 13, the parting or cutting part 6 of the shoe 3, a small part of the filler 8 and the valve parts with a small part of the cement guide plug 17, that was milled or cored around, standing up loose in the lower end of the casing 2. These loose parts are fished out with any suitable well known fishing tool. A sectional view of the lower end of the casing as set, sealed and milled will appear to be about as shown in Figure 3.

Other variations of the apparatus are useful in certain wells and openings. For instance, if a well be drilled by the standard or cable tool method in hard formations, no drilling mud is used in such a well; but at times considerable water is standing in the well coming from some water strata. And it may be necessary to "case off" this water with a casing and a tight seal about the lower end of the casing.

In such a case, if there is no "rat hole" the filler without the passageway 13 or the tube about the passageway (the heads of the container 9 in such an event may be made without any opening), and without the valve 14, the guide plug 17 or the head 11 may be let in and to the bottom of the well in a well known manner for similar objects and left on the bottom of the well. This requires a modified form of the shoe 3. This modified form of the shoe may have the swedged sides 5 of the shoe extended on down to the point of a cone, this of course will leave out the tubular parting edge 6 of the shoe 3. This modified shoe is attached to the casing in any suitable manner and the casing and shoe lowered in any well known way into the well bore.

When the modified shoe 3 strikes the top of the modified, sealed and fluid tight container 9 the shoe pierces the modified container 9 and if the modified container is made, as above pointed out, with walls partly ruptured, caused by deformation along vertical lines, then the container will be ruptured along these lines of deformation as the modified shoe 3 is forced by the weight of the casing 2 down through the modified container 9 and the filler 8.

It will be apparent in this last casing setting job that the fluid already present in the well could be used for wetting the filler 8, also the filler 8 might absorb some moisture from the walls of the well bore. Because the filler 8 can thus be wetted it is apparent that the receptacles 19 can be omitted if desired.

If in either of the above cementing jobs an asphaltum, for example, had been used and if as in the last well the cement filler was exposed, the asphaltum above the cement would be so stiff and slow in flowing that even if the cement became grouty thin it could not escape so as to avoid being subject to a very great pressure, so great as to force the cement into a most intimate contact with the wall of the well bore and into all cracks and crevices. Also the asphaltum because of its high specific gravity and ability to pick up sand and gravel would precede other fluids downwardly and most effectively prevent even a seepage past the seal. The advantages of the numerous other combinations are so very apparent that they need not be discussed.

In practicing the method and using the apparatus in a well drilled in accordance with the rotary system of drilling and containing drilling mud, the receptacles 19 in the container 9 may be omitted in those instances where the container 9 will be ruptured so as to admit water from the well to the cement filler 8, and the containers 19 may be omitted also in those cases where the container 9 is made of such material, for example temporarily waterproofed canvas, that will permit the gradual seepage of water into the container 9 after it has been located.

We claim:

1. A product of manufacture a sealed container containing dry hydraulic cement and a receptacle in the container and fluid for hydrating the cement in said receptacle.

2. A process of cementing casing into a well, under water, which comprises transporting hydraulic cement in a dry state while carrying embedded therein a frangible receptacle containing a set-accelerating reagent, under water, to the level where the cementing is to be done, mixing the said cement with a setting liquid to form a paste and forcing the paste, by downward movement of the casing, into sealing contact with the formation and between the casing and the formation.

3. In an apparatus for sealing wells, the combination of a fluid-tight receptacle containing a dry filler, such receptacle being carried in a fluid-tight manner on a tube, means for placing said receptacle, while fluid-tight, in the well adjacent to where the sealing is to be made, and means for then breaking said receptacle and for mixing said dry filler with a liquid setting agent, while at adjacent to said position, and for forcing the wetted filler into the opening which it is desired to seal.

4. A process of cementing casing into a well, under water, which comprises transporting a frangible receptacle containing hydraulic cement in a dry state, under water, to the level where the cementing is to be done, breaking said receptacle by lowering a casing in the well, mixing the said cement with a setting liquid to form a paste and, by a further downward movement of the casing into its final position, forcing said paste into sealing contact with the formation and between the casing and the formation.

5. The method of sealing a pipe in a well bore at a point below the level of the ground which comprises inserting a body of substantially dry hydraulic cementitious material within the well bore, lowering the said body of hydraulic cementitious material to the sealing position while maintaining said body of hydraulic cementitious material substantially inaccessible to any water prevailing in the well bore and thereafter rendering said body of hydraulic cementitious material accessible to water prevailing in the well bore and moving said hydraulic cementitious material into the space between the said pipe and the wall of the well bore at the sealing position by motion of said pipe.

6. The method of sealing a pipe in a well bore at a point below the level of the ground which comprises inserting a body of hydraulic cementitious material within the well bore, lowering the said body of hydraulic cementitious material to the sealing location while maintaining the said body of hydraulic cementitious material substantially inaccessible to any water prevailing in the well bore, thereafter inserting the pipe to be sealed into said body of hydraulic cementitious material while restraining entry of hydraulic cementitious material within said pipe to position the hydraulic cementitious material between the pipe and the well bore and to cause the same to ascend within the well bore around the pipe to be sealed, motion of the pipe also rendering said body of hydraulic cementitious material accessible to water within the well bore.

7. The method of sealing a pipe in a well bore at a point below the level of the ground which comprises inserting within a well bore a body of substantially dry hydraulic cementitious material containing a frangible container containing an aqueous medium, lowering the said body to the sealing location while maintaining the said body inaccessible to any water prevailing in the well bore, thereafter moving said pipe relative to said body to break said frangible container to liberate said aqueous medium for admixture with said hydraulic cementitious material.

8. The method of sealing a pipe in a well bore at a point below the level of the ground which comprises attaching to said pipe to be sealed a body of substantially dry hydraulic cementitious material containing a frangible container containing an aqueous medium, lowering said pipe with said body until the said body reaches the sealing location, thereafter moving said pipe relative to said body to break said frangible container to liberate the contents for admixture with said body of hydraulic cementitious material and to cause the said body of hydraulic cementitious material to fill the space between the said pipe and the wall of the well bore at the sealing position.

9. The method of sealing a pipe in a well bore at a point below the level of the ground which comprises attaching a container containing substantially dry hydraulic cementitious material to the pipe to be sealed within the well bore, lowering said pipe and attached container into the well bore until the container reaches the location where it is desired to produce the sealing, moving said pipe relative to said container to cause its contents to close the space between the pipe and the wall of the well bore at the sealing location and maintaining the substantially dry hydraulic cementitious material within the container substantially free of water until the said pipe is moved relative to said container to produce the sealing.

CHARLES R. EDWARDS.
OSCAR CODIER.